US006903266B1

(12) United States Patent
Luciere

(10) Patent No.: US 6,903,266 B1
(45) Date of Patent: Jun. 7, 2005

(54) COMPUTER CABLE ORGANIZER

(76) Inventor: Ralph Luciere, 276 Cedarhurst Ave., Cedarhurst, NY (US) 11516

( * ) Notice: Subject to any disclaimer, the term of this patent is extended or adjusted under 35 U.S.C. 154(b) by 0 days.

(21) Appl. No.: 10/872,977

(22) Filed: Jun. 21, 2004

(51) Int. Cl.$^7$ ................................................. H02G 3/04
(52) U.S. Cl. ....................... 174/48; 174/68.1; 174/68.3; 174/95; 385/135; 52/220.1; 52/220.7
(58) Field of Search ........................... 174/48, 49, 68.3, 174/68.1, 95, 97, 72 A, 74 A, 99 R, 96, 60, 100, 135; 220/3.2, 3.3, 4.02; 52/220.1, 220.3, 220.5, 220.7; 385/134, 135; 248/49, 56, 59, 65, 68.1, 70; 211/162, 166, 175, 207, 188; 439/207, 208, 209, 210, 212, 214, 215, 216; 384/134, 135

(56) References Cited

U.S. PATENT DOCUMENTS

| 3,038,558 | A | | 6/1962 | Plummer |
|---|---|---|---|---|
| 3,092,530 | A | | 6/1963 | Plummer |
| D251,779 | S | | 5/1979 | Wolff |
| 4,164,618 | A | * | 8/1979 | Casasanta .................... 174/48 |
| 4,203,639 | A | | 5/1980 | VandenHoek |
| 4,255,610 | A | | 3/1981 | Textoris |
| 4,602,124 | A | | 7/1986 | Santucci |
| D305,189 | S | | 12/1989 | Scherrer |
| 4,953,735 | A | | 9/1990 | Tisbo |
| 5,024,614 | A | | 6/1991 | Dola |
| 5,130,496 | A | | 7/1992 | Jenkins |
| 5,144,896 | A | | 9/1992 | Fortsch |
| 5,231,562 | A | | 7/1993 | Pierce |
| 5,235,136 | A | | 8/1993 | Santucci |
| 5,252,086 | A | | 10/1993 | Russell |
| 5,286,919 | A | | 2/1994 | Benson |

(Continued)

OTHER PUBLICATIONS cableorganizer.com Corner Ducts Raceways Printed on May 23, 2004.
cableorganizer.com Cord Caddy Organizational System Printed on May 23, 2004.
cableorganizer.com Cable Tamer Organizers by Aspect Printed on May 23, 2004.
cableorganizer.com Wire Duct Printed on May 23, 2004.
cableorganizer.com 1–Piece Latching Cable Raceway Printed on May 23, 2004.
cableorganizer.com Cable Tunnel Organizer Printed on May 23, 2004.
cableorganizer.com Cable Management Kit Printed on May 23, 2004.
cableorganizer.com WireTracks Printed on May 23, 2004.
cableorganizer.com 2–Piece Flex Tab Raceways Printed on May 23, 2004.
wiretrakusa.com Nonmetallic Wire Management Raceways and Accessories Printed on May 23, 2004.
computers4sure.com Computer Cable Clips Printed on May 23, 2004.
computers4sure.com Jacks/Faceplates/Raceways Printed May 23, 2004.

Primary Examiner—Dean A. Reichard
Assistant Examiner—Angel R. Estrada
(74) Attorney, Agent, or Firm—Brian Roffe

(57) ABSTRACT

A cable organizer including a first member defining an elongate channel receivable of cables and including a plurality of apertures through which the cables can be passed into or out of the channel and a second member defining an elongate channel and slidably connected to the first member. The second member is alternatively alignable with each of the plurality of apertures in the first member by sliding the second member along the first member, e.g., in a channel formed in connection therewith for this purpose, such that the cables can be guided from the channel in the first member to the channel in the second member.

20 Claims, 12 Drawing Sheets

U.S. PATENT DOCUMENTS

| | | | |
|---|---|---|---|
| 5,299,947 A | * 4/1994 | Barnard | 439/215 |
| 5,381,994 A | 1/1995 | Welch | |
| 5,395,399 A | 3/1995 | Rosenwald | |
| 5,600,098 A | 2/1997 | Kazaks | |
| 5,640,912 A | 6/1997 | Diffrient | |
| 5,809,900 A | 9/1998 | Alexander | |
| 5,831,211 A | * 11/1998 | Gartung et al. | 174/48 |
| 5,934,201 A | 8/1999 | Diffrient | |
| 5,934,203 A | 8/1999 | Glass | |
| 5,937,131 A | * 8/1999 | Haataja et al. | 385/135 |
| 5,971,508 A | 10/1999 | Deimen | |
| 5,971,509 A | 10/1999 | Deimen | |
| 6,003,447 A | 12/1999 | Cox | |
| 6,012,683 A | 1/2000 | Howell | |
| 6,037,538 A | 3/2000 | Brooks | |
| 6,192,805 B1 | 2/2001 | Saylor | |
| 6,211,460 B1 | 4/2001 | Hull | |
| 6,244,193 B1 | 6/2001 | Gutgsell | |
| 6,268,566 B1 | 7/2001 | Takiguchi | |
| 6,354,542 B1 | 3/2002 | Meyer | |
| 6,380,484 B1 | * 4/2002 | Theis et al. | 174/68.3 |
| 6,406,327 B1 | 6/2002 | Soon | |
| 6,410,855 B1 | 6/2002 | Berkowitz | |
| 6,424,248 B1 | 7/2002 | Toms | |
| 6,438,311 B1 | 8/2002 | Zarnowitz | |
| 6,448,497 B1 | 9/2002 | McCracken | |
| 6,452,805 B1 | 9/2002 | Franz | |
| 6,463,728 B1 | 10/2002 | Daoud | |
| D467,555 S | * 12/2002 | King et al. | D13/155 |
| 6,497,075 B1 | * 12/2002 | Schreiner et al. | 52/243.1 |
| 6,605,776 B1 | 8/2003 | Laukhuf | |
| 6,607,169 B1 | 8/2003 | Gershfeld | |
| D486,674 S | 2/2004 | Schoeben | |
| 6,713,678 B2 | 3/2004 | Masuda | |
| D488,054 S | 4/2004 | Myers | |
| 6,736,669 B1 | 5/2004 | Martin et al. | |
| 6,756,539 B1 | * 6/2004 | VanderVelde | 174/48 |
| 2002/0094184 A1 | 7/2002 | Mattei | |
| 2003/0051892 A1 | 3/2003 | Mattei | |
| 2003/0066936 A1 | 4/2003 | Beck | |
| 2003/0119384 A1 | 6/2003 | Zhang | |
| 2004/0020883 A1 | 2/2004 | Brokaw | |

\* cited by examiner

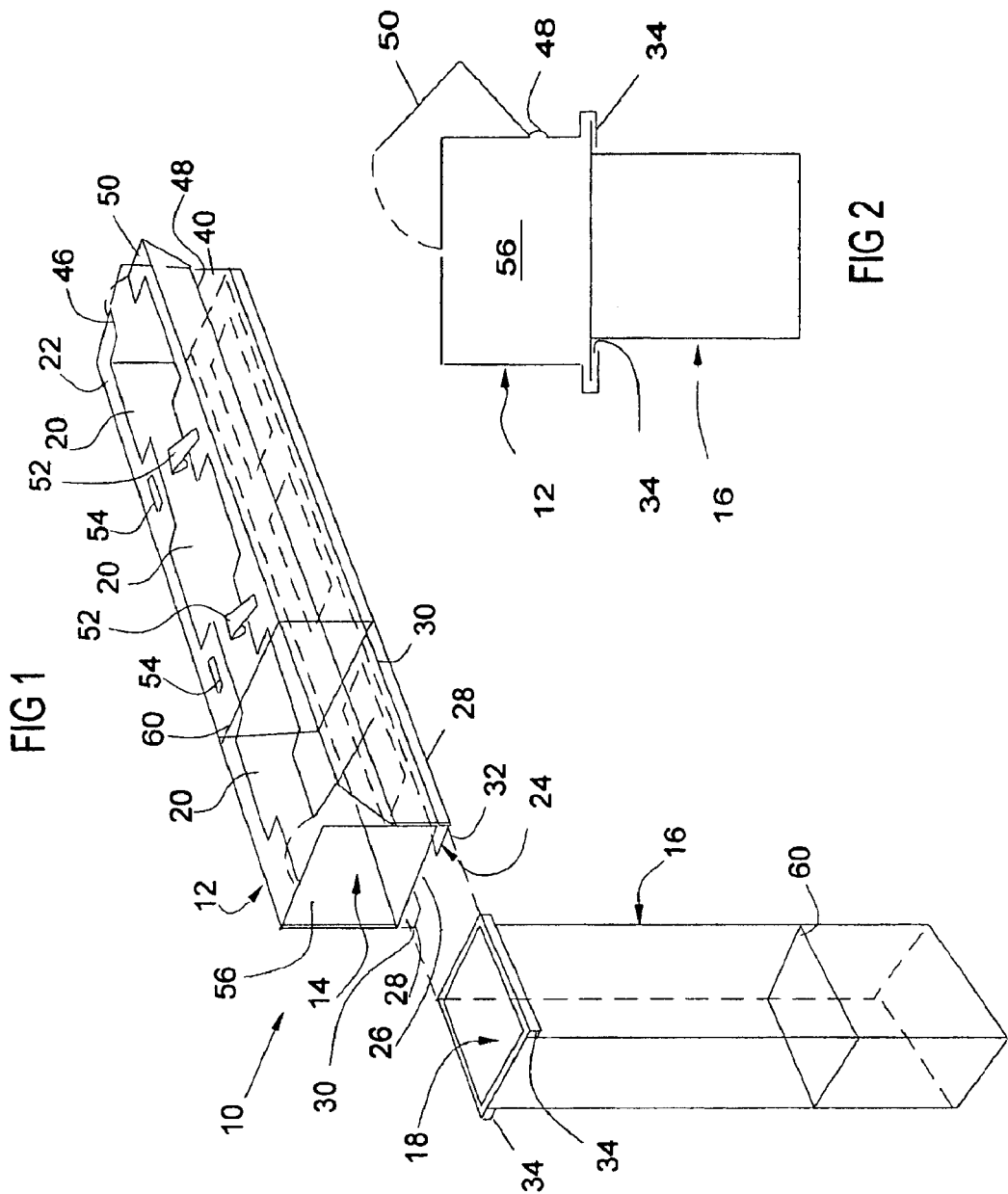

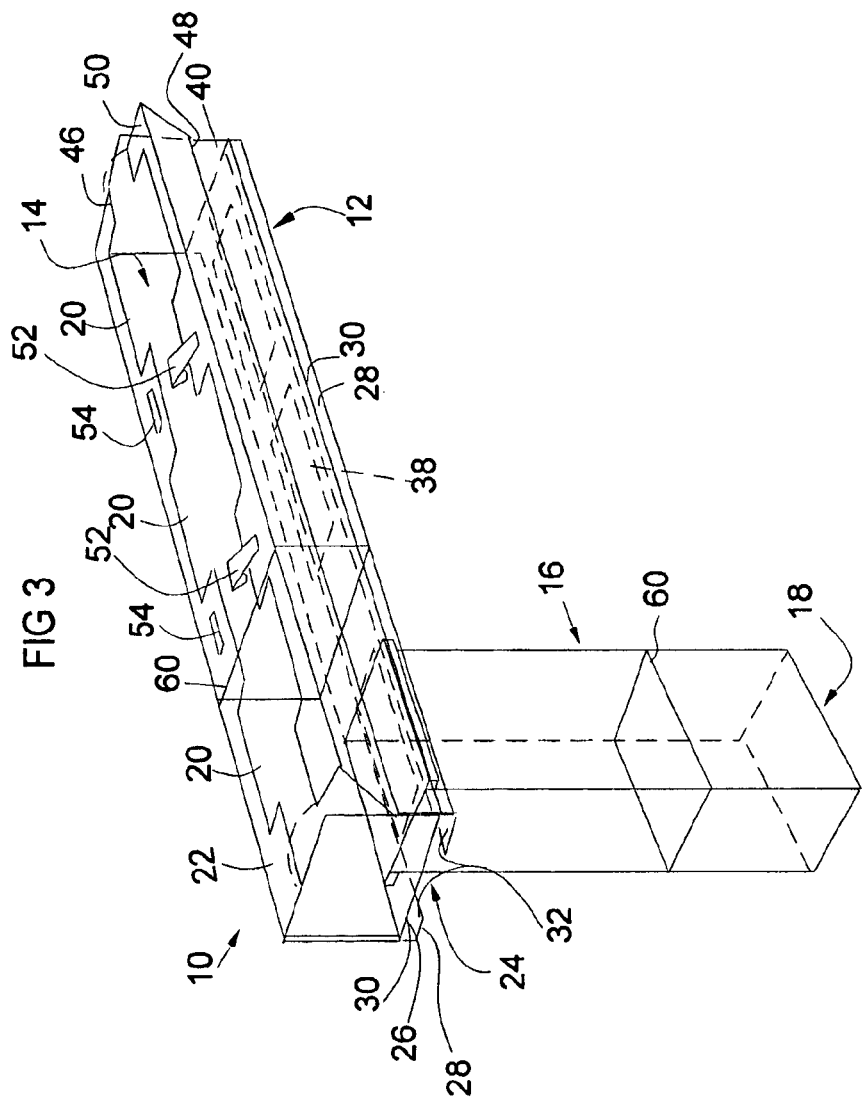

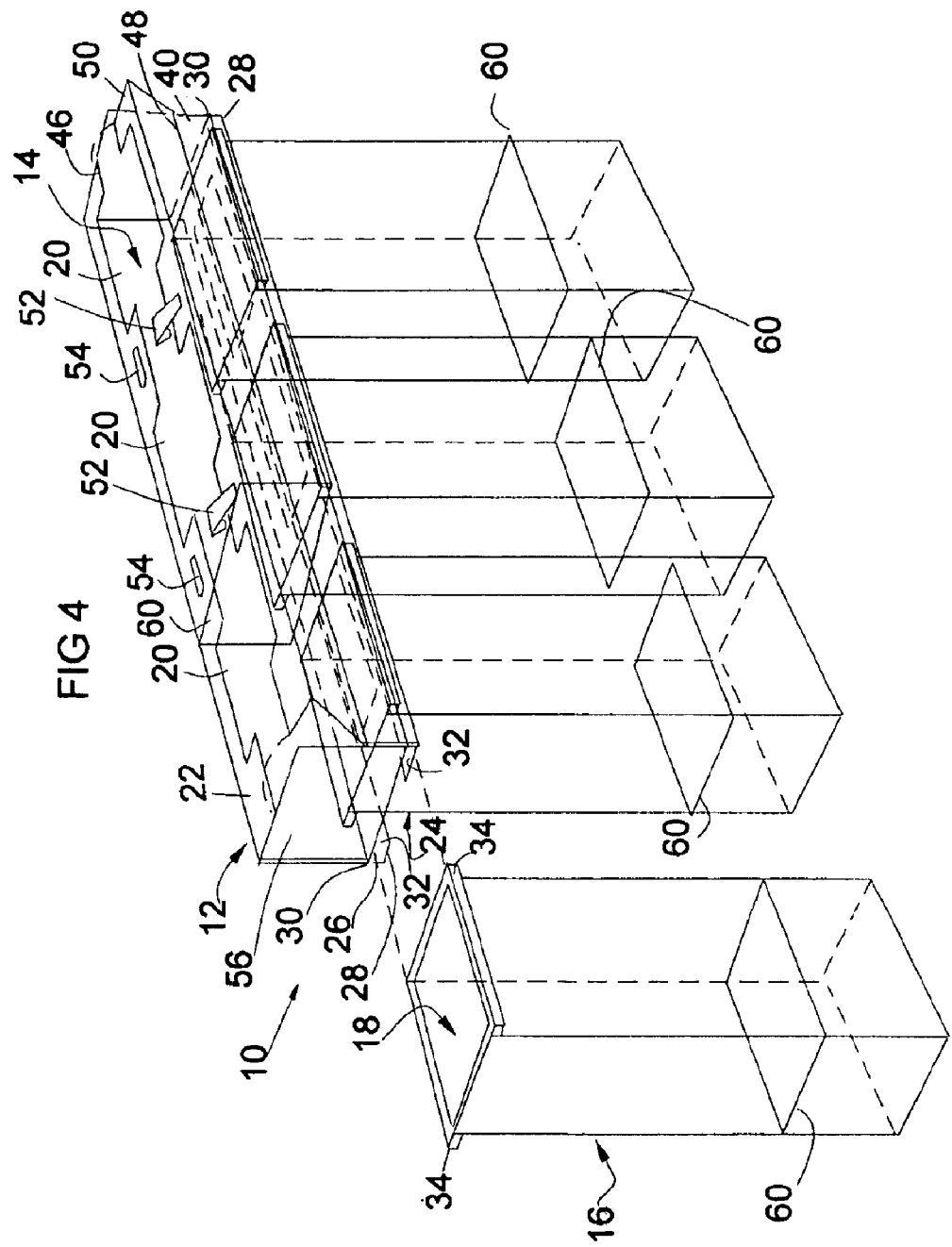

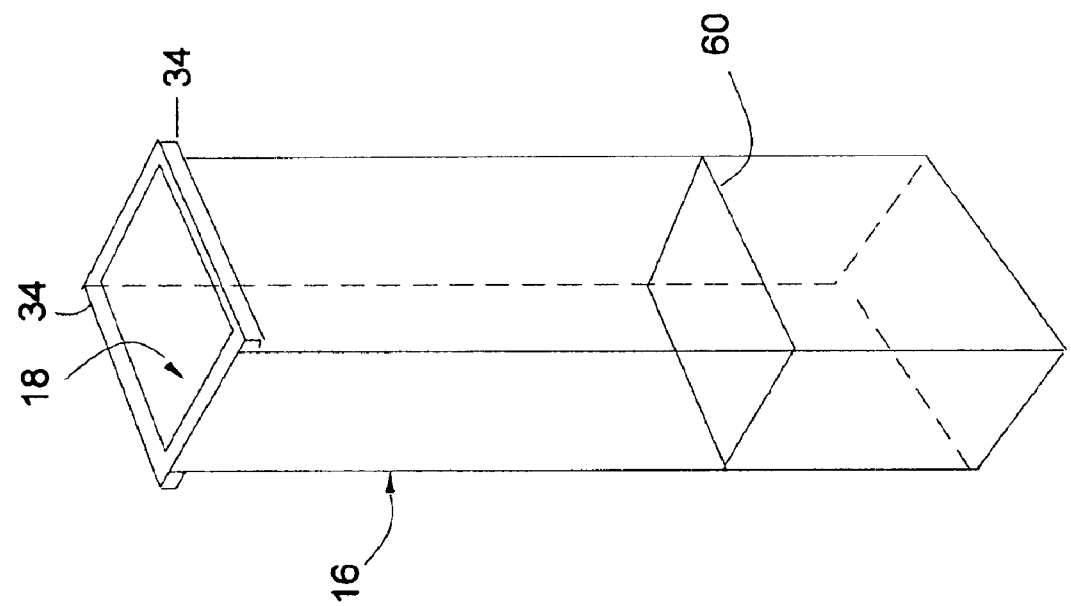

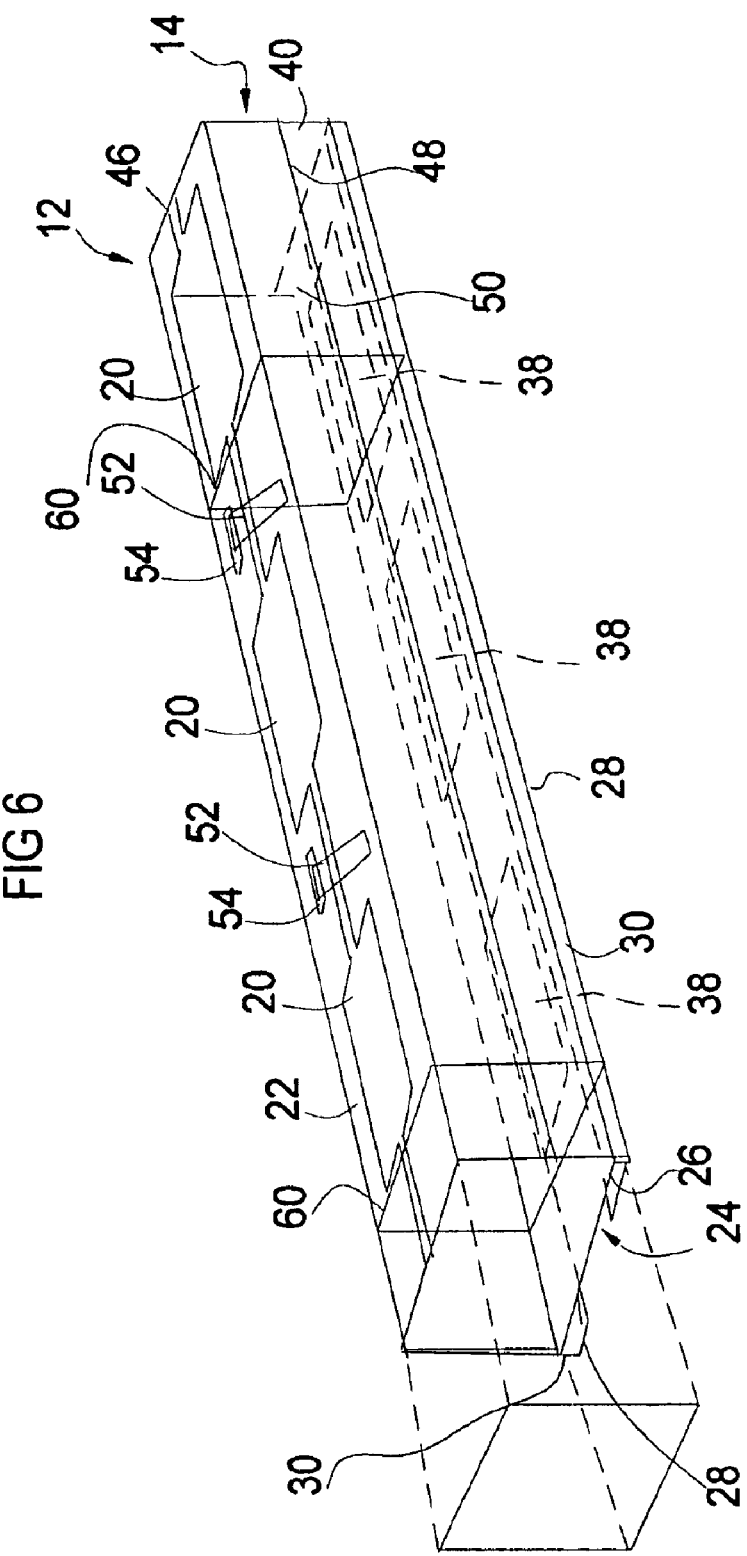

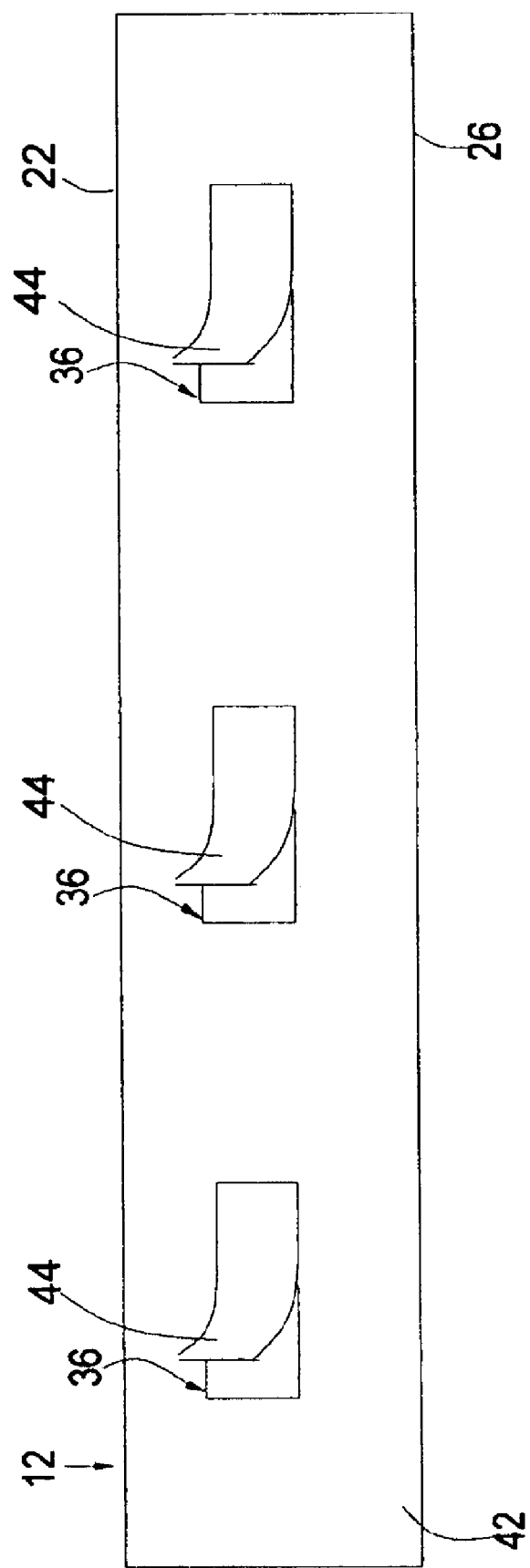

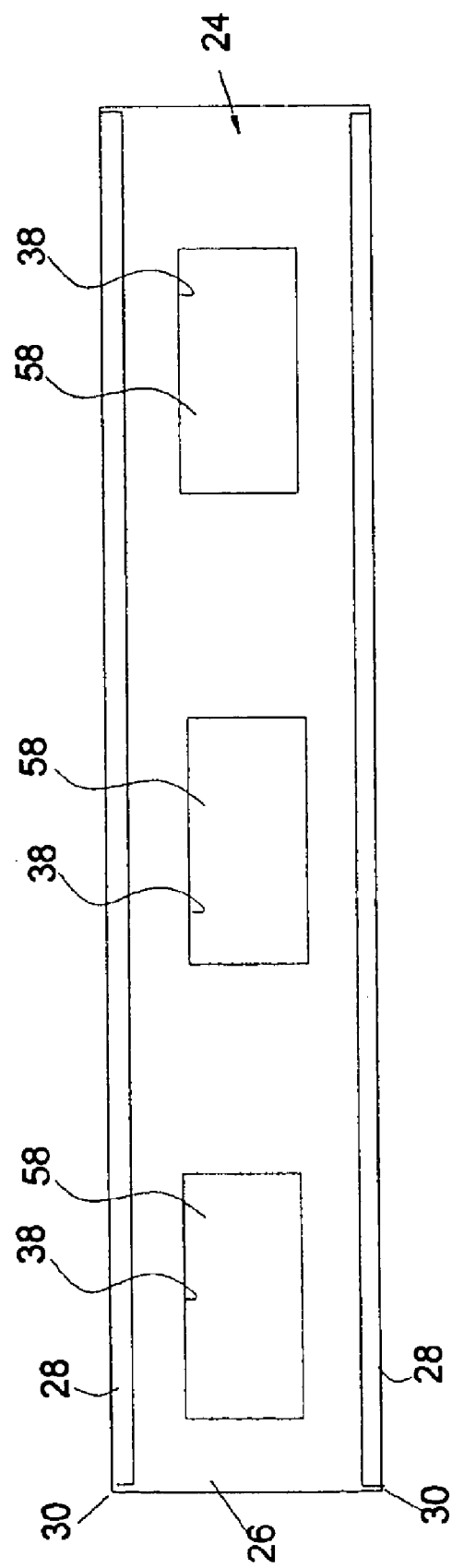

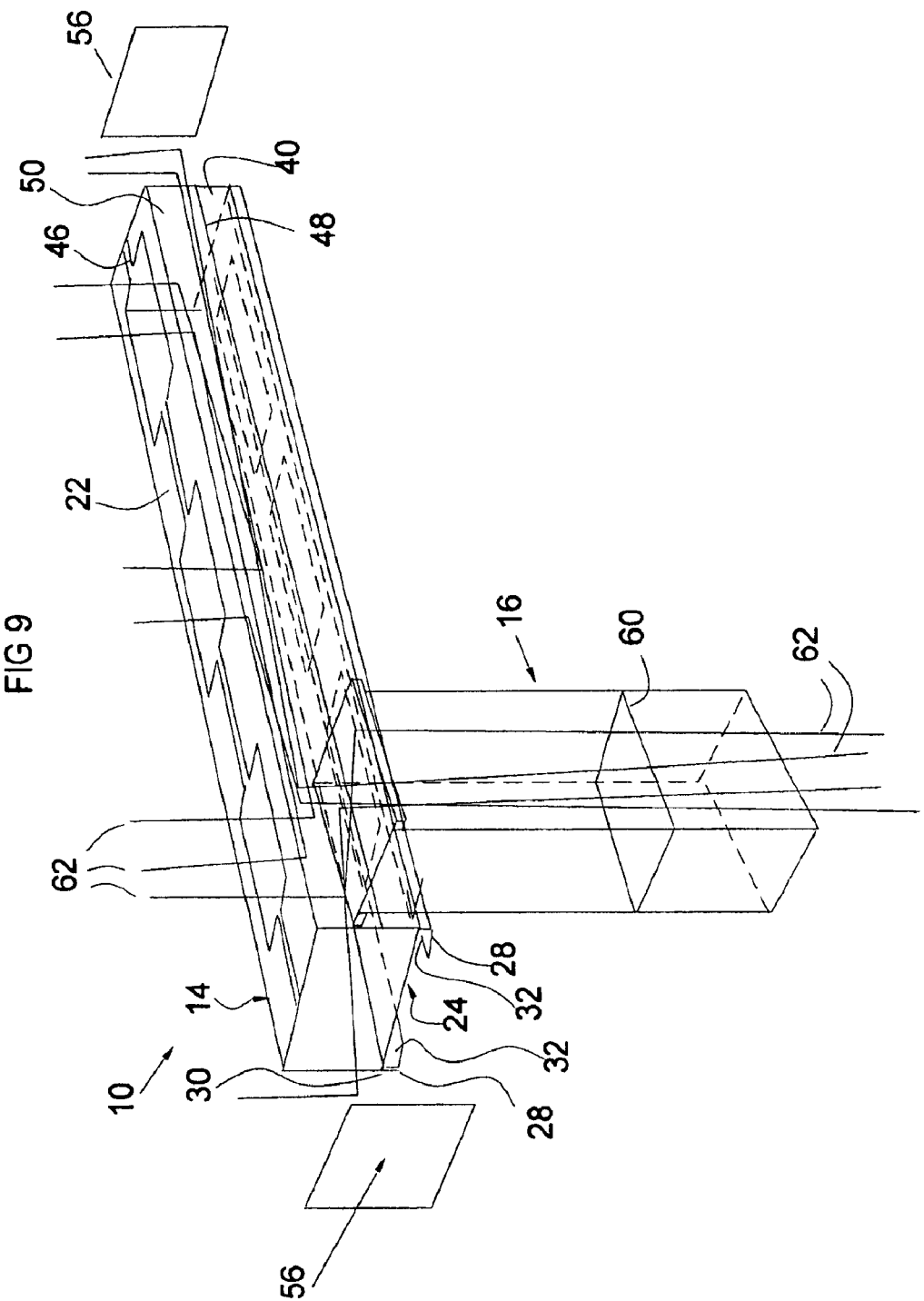

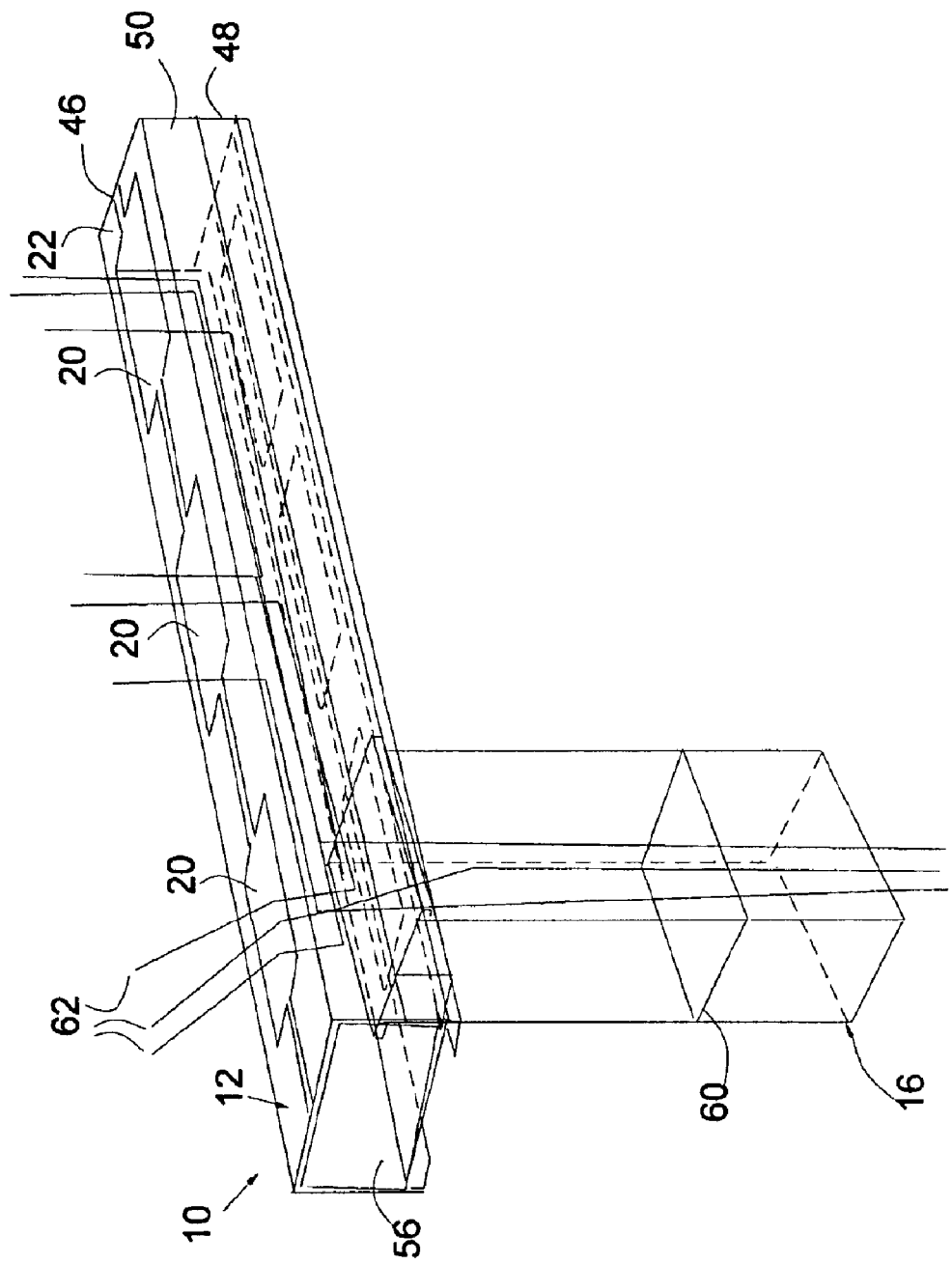

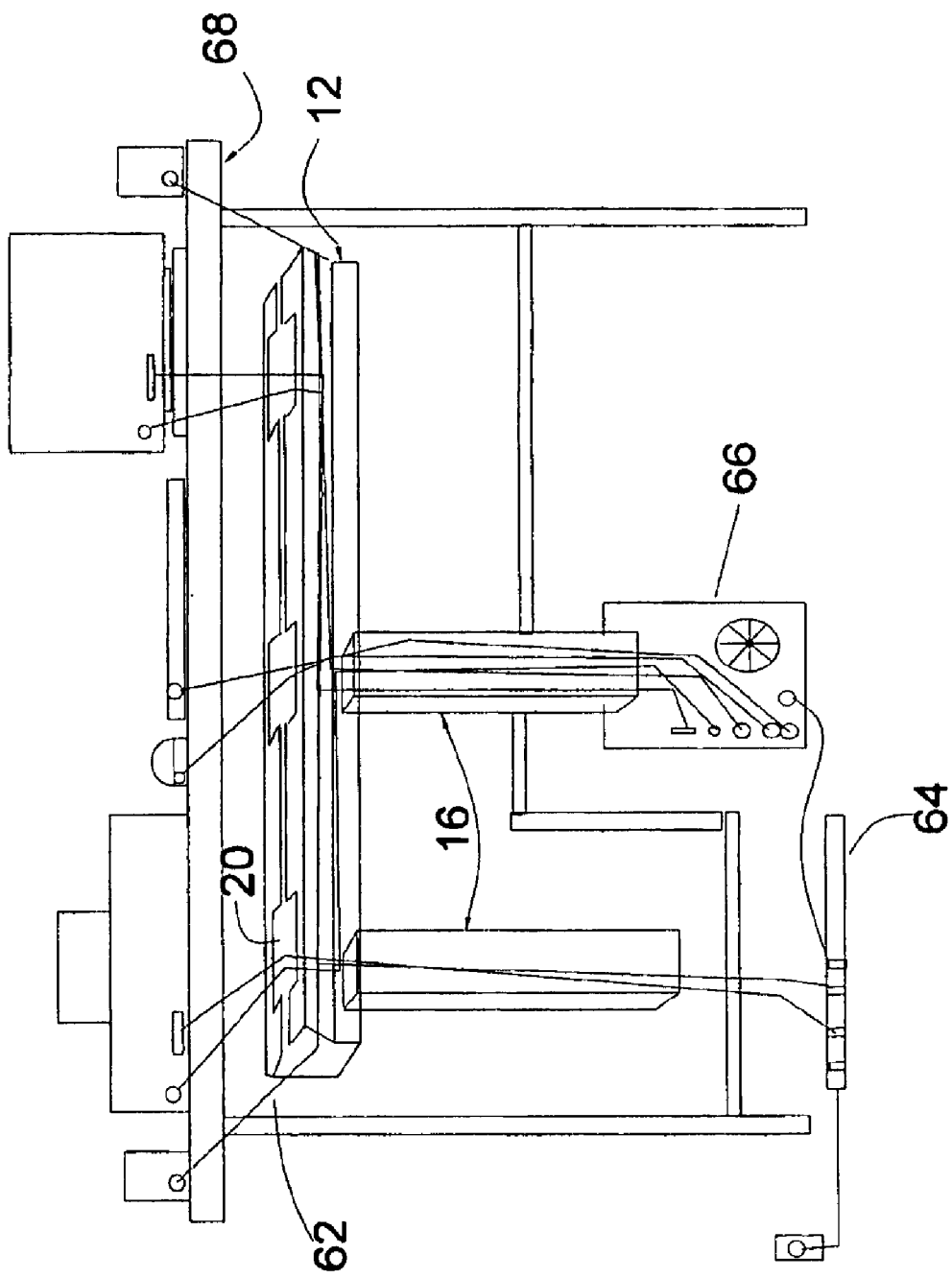

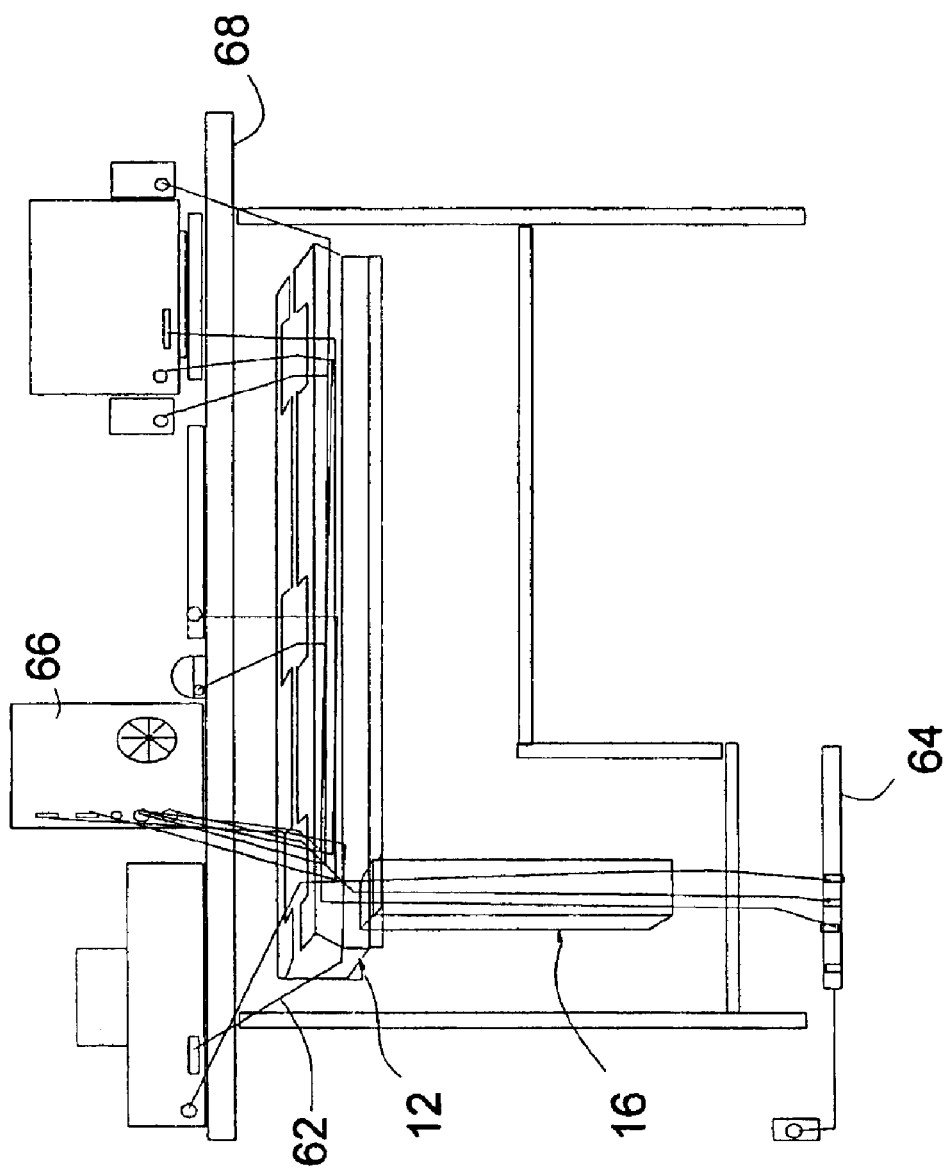

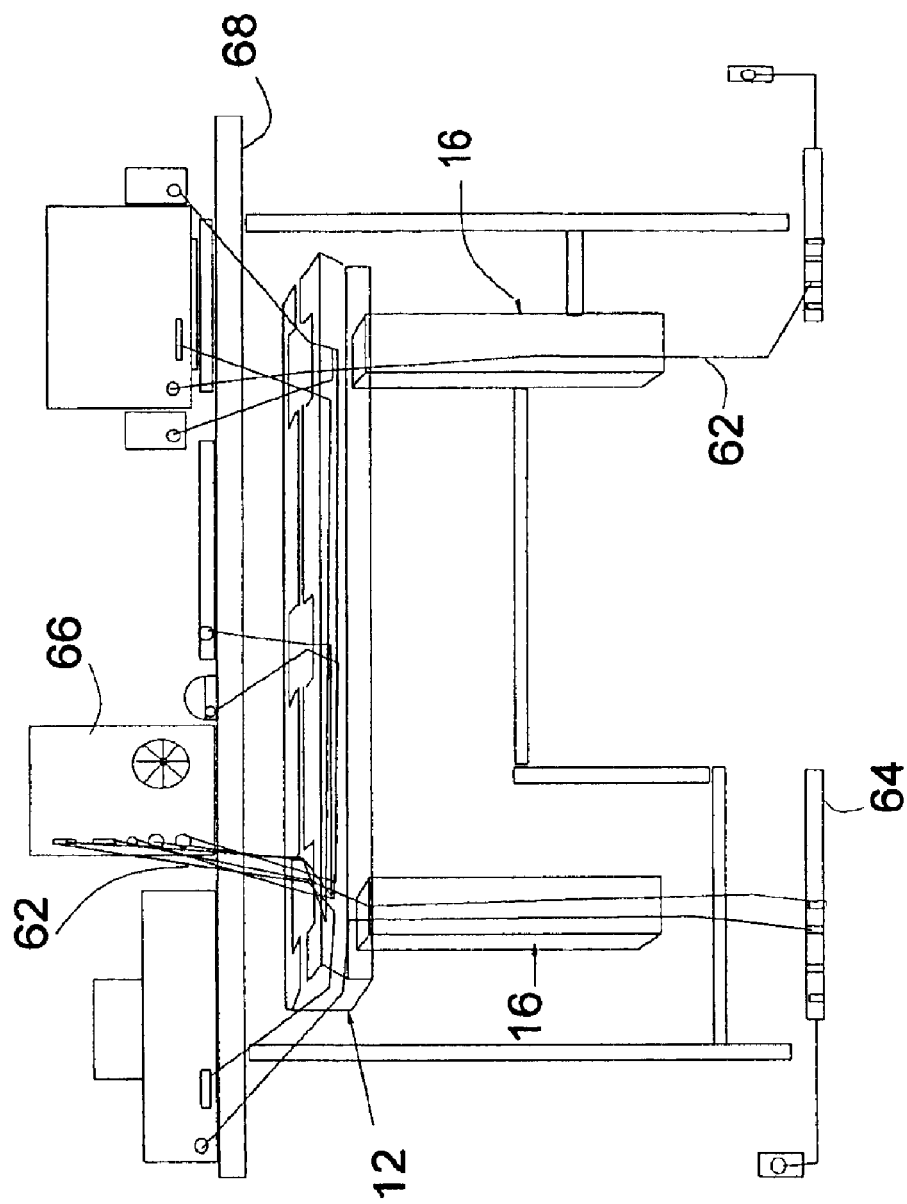

COMPUTER CABLE ORGANIZER

FIELD OF THE INVENTION

The present invention relates generally to a cable guiding or raceway structure and more specifically to a structure for guiding cables or wires connected to computers in an organized fashion. The cable organizer is particularly useful for organizing power and communication cables of a personal computer and its peripherals and accessories, such as a monitor, printer, keyboard, scanner, speaker, mouse and external memory devices.

BACKGROUND OF THE INVENTION

Personal desktop computers typically include a main processor housing, a monitor and speakers separate from the housing and input devices such as a keyboard and mouse which are also separate from the housing. Cables are used to connect the monitor, printer, speakers and input devices to the processor housing. Power cables are also required to connect the processor housing, and usually the monitor, to a power source. Often, a printer, scanner and possibly other peripherals such as an external memory device are also connected to the processor housing and require dedicated power cables. It is thus a recognized fact that there are a relatively large number of cables required to enable use of a desktop personal computer system.

Since the components of the personal computer system are typically spread out over a desktop surface, the communication cables leading from each component to the processor housing are invariably placed in an unorganized manner and the power cables from each powered component to the external power supply are similarly placed in an unorganized manner.

Various devices have been developed which create passages for or enclose multiple cables associated with a desktop personal computer system in order to organize the cables and reduce the unsightly appearance of cables of a personal computer system. For example, U.S. Pat. No. 5,600,098 (Kazaks) describes an electronic cable organizer made of a single piece of material with longitudinally extending side edges which are releasably connected together. In use, the piece of material is opened at the side edges and cables are placed in the material so that when the side edges are subsequently connected together, the cables are enclosed by the material. Each end of the body includes reinforced portions through which cables can pass. The body also includes ingress/egress apertures between the ends through which the cables can be passed into the body or out of the body, e.g., to connect to a peripheral or to lead into an end of another body (see FIG. 18).

Other prior art which describes cable or wire organizers includes U.S. Pat. No. 4,255,610 (Textoris), U.S. Pat. No. 5,144,896 (Fortsch), U.S. Pat. No. 5,231,562 (Pierce et al.), U.S. Pat. No. 5,235,136 (Santucci et al.), U.S. Pat. No. 5,640,912 (Diffrient), U.S. Pat. No. 5,934,201 (Diffrient), U.S. Pat. No. 5,934,203 (Glass), U.S. Pat. No. 5,971,508 (Deimen et al.), U.S. Pat. No. 6,037,538 (Brooks) and U.S. Pat. No. Des. 251,779 (Wolff et al.)

OBJECTS AND SUMMARY OF THE INVENTION

It is an object of the present invention to provide a new and improved cable guiding structure which hides cables from view.

It is another object of the present invention to provide a new and improved structure for guiding cables or wires connected to computers in an organized fashion, and in particular for organizing power and communication cables of a desktop personal computer and its peripherals and accessories, such as a monitor, printer, keyboard, scanner, speaker, mouse and external memory devices.

In order to achieve these objects and others, an organizer for cables in accordance with the invention includes a first member defining an elongate channel receivable of cables and including a plurality of apertures through which the cables can be passed into or out of the channel and a second member defining an elongate channel and slidably connected to the first member. The second member is alternatively alignable with each of the plurality of the apertures in the first member by sliding the second member along the first member, e.g., in a channel formed in connection therewith for this purpose, such that the cables can be guided from the channel in the first member to the channel in the second member.

In use, the first member is arranged in a substantially horizontal orientation on the back of a desk or wall behind a desk on which the desktop computer is situated and the second member is arranged in a substantially vertical orientation on the back of the desk or wall and below the first, horizontal member. In this manner, the cables from the peripherals and accessories are guided directly into the horizontal member at the horizontal location where they are situated, with a minimum of cable being exposed. The cables are then guided through the channels in the first and second members to the connection port at the processor housing or an electrical receptacle. The vertical member is arranged proximate the processor housing to provide a minimum of exposed cable length, i.e., distance, between the opening of the second member and the rear of the processor housing.

Once the cable organizer in accordance with the invention is installed, the cables are substantially concealed with only a minimum length of the cables being exposed. Moreover, the cables are organized together in the cable organizer.

In one embodiment, the first and second members are provided with substantially polygonal cross-sections, e.g., rectangular, and both the upper and lower sides of the first member include apertures. Cables associated with the peripherals and accessories are passed from the channel in the first member through an aperture in the upper side thereof to the peripherals and accessories, i.e., preferably the aperture closest to the horizontal position of the peripheral or accessory on the desk. The lower side of the first member includes a plurality of apertures so that the second member is slidable along the lower side of the first member to align with one of these apertures, depending for example on which aperture will result in the second member being closest to the processor housing.

The channel of the first, horizontal member, in which the second member slides, preferably opens at one or both ends to enable the second member to be slid into this channel and removed therefrom. As such, it is possible to package the first and second members apart from one another, e.g., alongside one another, and then have the purchaser easily assemble the cable organizer.

To facilitate the placement of the cables into the first, horizontal member, the first member may be provided with a longitudinal slit and is openable about the slit to expose the channel therein. In this embodiment, the first member has a mounting portion and an access portion pivotally connected thereto with the slit being defined between the access portion and the mounting portion. The mounting portion is provided with an attachment mechanism to enable attachment to a vertical surface such as the back of the desk or a wall behind the desk.

BRIEF DESCRIPTION OF THE DRAWINGS

The following drawings are illustrative of embodiments of the invention and are not meant to limit the scope of the invention as encompassed by the claims.

FIG. 1 is an exploded perspective view of a cable organizer in accordance with the invention.

FIG. 2 is a side view of one embodiment of a cable organizer in accordance with the invention.

FIG. 3 is a perspective view of the cable organizer in accordance with the invention shown with the channel access flap open.

FIG. 4 is a perspective view of the cable organizer in accordance with the invention shown with the channel access flap open and the alternative positions of the vertical member.

FIG. 5 is a perspective view of the vertical member of the cable organizer in accordance with the invention.

FIG. 6 is a perspective view of the horizontal member of the cable organizer in accordance with the invention.

FIG. 7 is a rear view of the horizontal member of the cable organizer in accordance with the invention.

FIG. 8 is a bottom view of the horizontal member of the cable organizer in accordance with the invention.

FIG. 9 is a perspective view of the cable organizer in accordance with the invention shown with cables and the end caps removed.

FIG. 10 is a perspective view of the cable organizer in accordance with the invention shown with cables and the end caps in place.

FIG. 11 is a rear view of a desktop personal computer system with the cable organizer in accordance with the invention.

FIG. 12 is a rear view of a desktop personal computer system with the cable organizer in accordance with the invention.

FIG. 13 is a rear view of a desktop personal computer system with the cable organizer in accordance with the invention.

DETAILED DESCRIPTION OF THE INVENTION

Referring to the accompanying drawings wherein like reference numerals refer to the same or similar elements, FIG. 1 shows an organizer for cables in accordance with the invention which is designated generally as 10. The organizer 10 includes a first raceway member 12 defining an elongate channel 14 receivable of cables and a second raceway member 16 defining an elongate channel 18 receivable of cables and which is placed at an angle to the first member 12, preferably perpendicular thereto. As discussed in more detail below, the second member 16 is slidable relative to the first member 12 and therefore positionable at different positions along the length of the first member 12.

To enable cables from the computer and its peripherals and accessories to pass into and out of the channel 14 in the first member 12, apertures 20 are formed in an upper face 22 of the first member 12. Apertures 20 should be of sufficient size to enable standard cables used for personal computers and their peripherals and accessories to pass therethrough.

The number of apertures 20 can vary depending, for example, on the length of the first member 12. Thus, one aperture 20 could be provided for every foot of length of the first member 12 so that a first member 12 having a three foot length would include three apertures 20 spaced evenly along the length of the first member 12.

The first member 12 also includes a sliding channel 24 formed along or below a lower face 26 and in which the second member 16 slides. Channel 24 is defined by a pair of opposed L-shaped lips 28 extending downward from longitudinally extending corners 30 of the first member 12. Lips 28 provide a support surface 32 on which flanges 34 formed at the upper end of the second member 16 rest and slide. Lips 28 may be formed integral with the remaining portion of the first member 12 or separate therefrom and attached thereto during fabrication of the organizer 10. In alternative embodiments, the lips 28 can be attached to front and rear faces 40, 42 of the first member 12 or to flanges projecting outward from the bottom of the front and rear faces 40, 42 (as shown in FIG. 2).

One or both ends of the channel 24 are open in order to enable the second member 16 to be inserted into and removed from the channel 24. This is advantageous since the organizer 10 might be packaged and sold with the first and second members 12, 16 side by side and assembly of the organizer 10 would be required. This assembly would entail simply sliding the second member 16 into the channel 24 through an open end thereof. An appropriate mechanism for retaining the second member 16 in the channel 24 in order to prevent unintentional or inadvertent removal of the second member 16 from the channel 24 could also be provided. For example, a removable clip, clasp or lock could be placed in engagement with the ends of the channel 24.

The lower face 26 of the front member 12 also includes one or more apertures 38 opening into the channel 24 and providing access between the cable-receiving channel 14 and the member-receiving channel 24. Apertures 38 enable cables from the channel 14 in the first member 12 to pass into the channel 18 in the second member 16 when the second member 16 is present in the channel 24 in a position in which its open upper end aligns with a respective one of the apertures 38. More particularly, the second member 16 is moved along the channel 24 until its open upper end aligns with one of the apertures 38 at which point, channel 18 is in communication with channel 14 and cables can pass between the channels 14, 18 in the first and second members 12, 16, respectively. FIG. 4 shows the various possible, operative positions of the second member 16 relative to the first member 12, and specifically, the second member 16 in alignment with each of the apertures 38 in the first member 12.

As with the apertures 20 in the upper face 22 of the first member 12, the number of apertures 38 can vary depending, for example, on the length of the first member 12 and when the first member 12 is particularly short, there may even be a single aperture 38. Apertures 38 in the lower face 26 of the first member 12 do not have to align with apertures 20 in the upper face 22. Indeed, each aperture 38 can be offset from the apertures 20. Moreover, there may be a different number of apertures 20 in the upper face 22 than apertures 38 in the lower face 26. At a minimum, there may be two apertures 38 in the lower face 26 and one aperture 20 in the upper face 22 since cables can also be passed into the channel 14 from the peripherals and accessories through the ends thereof.

Apertures 38 should be of sufficient size to enable a plurality of standard cables used for personal computers and their peripherals and accessories to pass therethrough. The size of apertures 38 might also be the same as the size of the open ends of the second member 16 to enable easy passage of cables from the channel 14 in the first member 12 through an aperture 38 and into the channel 18 in the second member 16.

Although cables can be placed into the channel 14 in the first member 12 through the apertures 20, it would be difficult to then guide these cables through the channel 14 and then through an aperture 38 leading into the channel 18 in the second member 16. Therefore, to facilitate the placement of cables into the channel 14 in the first member 12, preferably the first member 12 is designed to open to provide access to the channel 14. For example, in the illustrated embodiment, the first member 12 is formed with a longitudinal slit 46 on the upper face 22 and a hinge 48 on the front face 40 so that an access flap 50 is formed comprising a part of the front face 40 above the hinge 48 and a forward part of the upper face 22 in front of the slit 46. Flap 50 is pivotable about the hinge 48 to expose the channel 14.

A looking mechanism is provided to secure the flap 50 to the remaining portion of the first member 12, which is referred to as a mounting portion as it will be that portion which is mounted to a vertical surface such as the rear surface of a desk. The locking mechanism may comprise one or more flexible tabs 52 formed on the flap 50 and a corresponding cut-out 54 formed on the upper face 26 of the mounting portion of the first member 12. To open the flap 50 and expose the channel 14, each tab 52 is flexed upward out of engagement with the corresponding cut-out 54 and the flap 50 is then urged rearward to pivot about the hinge 48. To close the channel 14 once the cables have been threaded through tho first and second members 12, 16, the flap 50 is pivoted forward until each tab 52 is present in the corresponding cut-out 54.

The slit 46 can be formed to traverse the apertures 20. In this case, when the flap 50 is in an open position, cables from the computer and its peripherals and accessories can be guided both through the apertures 20 into the channel 14 and through the channel 14 to and through one of the apertures 38 aligning with the open upper end of the second member 16 and into the channel 18 therein.

The mounting portion of the first member 12 includes a mechanism for enabling its attachment to a vertical surface such as the rear surface of a desk. This attachment mechanism may be arranged on or in connection with the rear face 42 of the first member 12 and may be any known type of attachment mechanism. For example, if hook and loop fasteners (e.g., VELCRO(TM), are used, one set of fasteners is adhered to the rear face 42 while another set is adhered to the vertical surface so that engagement of the sets of fasteners together results in attachment of the first member 12 to the vertical surface. Alternatively, double-sided adhesive could be used in a continuous strip along the rear face 42 or in segments 36 at different positions along the rear face 42 (see FIG. 7). A removable protective strip 44 is used to cover the adhesive strip segments 36 until the user is ready to attach the first member 12 to the vertical surface.

The first and second members 12, 16 may be made of a rigid plastic material and with a substantially rectangular cross-section, or with another polygonal configuration. The first member 12 would be formed with several longitudinally extending walls, i.e., a front wall defining the front face 40 and on which the hinge 48 may be formed, an upper wall defining the upper face 22 and on which the apertures 20 are formed, a rear wall defining the rear face 42 and on which the attachment mechanism is arranged, a lower wall defining the lower face 26 and in which the apertures 38 are arranged and which is formed above the lower edges of the front and rear walls (with the channel 14 being defined by these walls), and support flanges extending inward from the lower edges of the front and rear walls and a distance from the lower wall to thereby define the member-receiving channel 24 between the support flanges and the lower wall. A lower portion of the front and rear walls below the lower wall and the support flanges thereby define the L-shaped lips 28. End walls 56 may also be formed for the first member 12 to close the longitudinal ends of the channel 14. End walls 56 may be designed to be separable from the first member 12 for use in those situations where cables are to be passed into the channel 14 through one or both of its ends. For example, the end walls 56 could be formed to be able to be easily punched out from the first member 12, e.g., by forming perforations around the end walls 56.

In one embodiment, the upper and lower walls of the first member 12 may be formed with panels 58 covering the apertures 20, 38 and with means for enabling the panels 58 to be removed. FIG. 8 shows panels 58 covering the apertures 38. For example, the panels 58 could be attached to a remaining portion of the first member 12 by small strips of material so that open sections are provided between the strips of material which resemble perforations in the first member 12. The user would then break the strips of material holding the panel 58 in the aperture 20, 38 in order to ready the desired aperture(s) 20, 38 for use.

As shown in FIG. 5, the second member 16 may be formed with solid longitudinally extending walls and open longitudinal ends. Flanges 34 project outward from the upper edge of a pair of opposed walls. The upper width of the second member 16, i.e., from the outer edge of one flange 34 to the outer edge of the other flange 34 is less than the width of the channel 24 to enable the second member 16 to slide in the channel 24. Also, the width of the second member 16 is less than the space between the inner edges of the lips 28 to enable the second member 16 to fit between the lips 28.

It is envisioned that the organizer 10 would be packaged and sold as a kit with the first and second members 12, 16 placed side by side and enclosed in a common enclosure or bound together. It would also be preferable to sell a kit with only a single size of the first member 12 and a single size of the second member 16. Since different users may need a different length of the first and/or second members 12, 16, various kits might be needed and could be produced if so desired. However, to avoid this situation, the first and second members 12, 16 may be formed with peripherally weakened sections 60. Each peripherally weakened section 60, which may comprise score lines or perforations extending through the walls of the first and second members 12, 16, enables the first and second members 12, 16 to be shortened to the desired length by cutting or breaking the first and second members 12, 16 along one of the weakened sections 60. In this manner, the organizer 10 can be packaged and sold with a standard length of the first and second member 12, 16 while providing the user with the ability to reduce the length of the first member 12 and/or the height of the second member 16 to a desired dimension.

To use the organizer 10, the user would mount the first member 12 to the rear surface of a desk. Prior to or after such mounting, the user would slide the second member 16 into the member-receiving channel 24 in the first member 14 through an open end thereof. The end of the channel 24 through which the second member 16 is slid would preferably be the one closest to the aperture 38 in the first member 12 to be aligned with the channel 18 in the second member 16. The apertures 20, 38 to be used in the set-up would be identified and if present, panels 58 would be removed from the identified apertures 20, 38. The flap 50 is then pivoted outward to expose the channel 14 in the first member 12. Each cable from the computer and its peripherals and accessories is then inserted through a respective aperture 20 closest to the component, through the channel 14, through an aperture 38 in alignment with the channel 18 in the second member 16 and then into and through the channel 8. Once all of the cables have been passed into and through the organizer 10, the flap 50 is closed and each tab 52 is pressed into a corresponding cut-out 54.

Using the organizer 10, the various power and communication cables associated with a computer and its peripherals and accessories are effectively concealed and guided together in an aesthetically pleasing manner such as shown in FIGS. 9–13. The cables are represented by lines 62. As shown in FIG. 9, since the end walls 56 are removed, cables 62 can also be passed into the channel 14 in the first member 12 via the open ends thereof.

As shown in FIG. 11, it is also possible to use two vertically oriented second members 16, each in alignment with a respective aperture 38 and both being slidable in the channel 24. In this manner, one vertically oriented second member 16 could be positioned in alignment with the processor housing 66 which is placed below the desk 68 while the other could be positioned to lead to a power strip 64. The power cables would thus be directed through the second member 16 to the power strip 64.

As shown in FIG. 12, if the processor housing 66 is arranged on the desk 68, then only a single second member 16 is provided to guide the power cables to the power strip 64.

As shown in FIG. 13, two vertically oriented second members 16 are provided, each leading to a respective power strip 64.

From FIGS. 11–13, it can thus be seen that multiple vertically oriented second members 16 can be provided depending on the configuration of the personal computer system. The invention is not limited to anyone configuration and the first and second members 12, 16 can be used in a variety of different ways to achieve the objects of the invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. For example, variations to the first and second members 12, 16 include the formation of the first and second members 12, 16 in any one of a variety of different colors and textures, such as black, putty, tan, gray, white and wood-grain. By providing a variety of colors, an organizer 10 can be purchased which matches the mounting location, i.e., matches the purchaser's desk.

I claim:

1. An organizer for cables, comprising;
a first member defining an elongate channel receivable of cables, said first member including a plurality of apertures through which the cables are passable into or out of said channel; and
a second member defining an elongate channel and slidably connected to said first member, said channel in said second member being alternatively in communication with each of said apertures of said first member by sliding said second member along said first member such that the cables are passable front said chancel in said first member to said channel in said second member through one of said apertures.

2. The organizer of claim 1, wherein said first member has an upper side and an opposed lower side, said upper side including at least one of said apertures and said lower side including at least two of said apertures, said second member being slidable along said lower side of said first member.

3. The organizer of claim 2, wherein said first member includes a second channel along said lower side, said second member being slidable in said second channel.

4. The organizer of claim 1, wherein said first member includes a second channel, said second member being slidable in said second channel.

5. The organizer of claim 4, wherein said second channel of said first member opens at one end of said first member to enable said second member to be slid into said second channel and removed from said second channel.

6. The organizer of claim 4, wherein said first member includes a pair of opposed L-shaped lips defining said second channel therebetween.

7. The organizer of claim 4, wherein said first member has an upper side and an opposed lower side, said lower side including at least two of said apertures, said second channel of said first member being in communication with said at least two apertures in said lower side of said first member.

8. The organizer of claim 1, wherein said first member has a longitudinal slit and is openable about said slit to expose said channel.

9. The organizer of claim 8, wherein said first member has a mounting portion and an access portion pivotally connected to said mounting portion, said slit being defined between said access portion and said mounting portion.

10. The organizer of claim 9, further comprising locking means for locking said access portion to said mounting portion.

11. The organizer of claim 10, wherein said locking means comprises at least one flexible tab formed on said access portion and at least one corresponding cut-out formed on said mounting portion and receivable of a respective one of said at least one tab.

12. The organizer of claim 8, wherein said first member has an upper side including at least one of said apertures and said slit traverses said at least one of said apertures.

13. The organizer of claim 1, further comprising attachment means arranged in connection with said first member for attaching said first member to a vertical surface.

14. The organizer of claim 1, wherein said first and second members are rigid.

15. The organizer of claim 1, wherein said channel of said first member has open longitudinal ends, further comprising end walls removably connected to said first member to selectively close said open ends of said channel.

16. An organizer for cables, comprising:
a first rigid member defining an elongate channel receivable of cables, said first member including a plurality of apertures through which the cables are passable into or out of said channel, said first member having a longitudinal slit, a mounting portion and an access portion pivotally connected to said mounting portion, said slit being defined between said access portion and said mounting portion; and a second rigid member defining an elongate channel which is alternatively in communication with each of said apertures of said first member such that the cables are passable from said channel in said first member to said channel in said second member through one of said apertures.

17. The organizer of claim 16, wherein said second member is slidably connected to said first member and said channel in said second member is alternatively alignable with each of said apertures of said first member by sliding said second member along said first member.

18. The organizer of claim 16, wherein said first member has an upper side and an opposed lower side, said upper side including at least one of said apertures and said lower side including at least two of said apertures.

19. The organizer of claim 16, wherein said first member has an upper side including at least one of said apertures and said slit traverses said at least one of said apertures.

20. An organizer for cables, comprising:

a first member defining an elongate channel receivable of cables, said first member including a plurality of apertures through which the cables arm passable into or out of said channel; and a second member defining an elongate channel and slidably connectable to said first member, said channel in said second member being alternatively in communication with each of said apertures of said first member by sliding said second member along said first member such that the cables are passable from said channel in said first member to said channel in said second member through one of said apertures, said first and second members being perpendicular to one another when connected together.

* * * * *